(12) United States Patent
Specht et al.

(10) Patent No.: US 8,370,592 B1
(45) Date of Patent: Feb. 5, 2013

(54) MULTI-MACHINE ATOMIC SEAMLESS MIGRATION

(75) Inventors: Michael Specht, Acton, MA (US); Steven Goldberg, Ashland, MA (US); Ian Wigmore, Westborough, MA (US); Patrick Brian Riordan, West Newton, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 498 days.

(21) Appl. No.: 12/750,382

(22) Filed: Mar. 30, 2010

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)
*G06F 3/00* (2006.01)
*G06F 5/00* (2006.01)

(52) U.S. Cl. ............... 711/162; 707/661; 710/38
(58) Field of Classification Search ............... 711/162
See application file for complete search history.

(56) References Cited

U.S. PATENT DOCUMENTS

| | | | |
|---|---|---|---|
| 6,938,039 B1 * | 8/2005 | Bober et al. | ............ 707/704 |
| 7,434,022 B1 | 10/2008 | Scharland et al. | |
| 7,536,503 B1 | 5/2009 | Venkatanarayanan et al. | |
| 7,634,595 B1 | 12/2009 | Brown et al. | |
| 7,640,408 B1 | 12/2009 | Halligan et al. | |
| 7,689,786 B1 | 3/2010 | Riordan et al. | |
| 7,707,331 B1 | 4/2010 | Brown et al. | |
| 7,797,500 B1 | 9/2010 | Lewis et al. | |
| 7,856,022 B1 | 12/2010 | Wigmore | |
| 8,028,062 B1 | 9/2011 | Wigmore et al. | |
| 8,028,110 B1 | 9/2011 | Wigmore | |
| 8,060,710 B1 | 11/2011 | Don et al. | |
| 8,065,276 B2 * | 11/2011 | Pudipeddi et al. | ............ 707/661 |
| 2010/0318692 A1 * | 12/2010 | Koll et al. | ............ 710/38 |

* cited by examiner

*Primary Examiner* — Yaima Campos
*Assistant Examiner* — Craig Goldschmidt
(74) *Attorney, Agent, or Firm* — BainwoodHuang

(57) ABSTRACT

A technique migrates data from source arrays to target arrays. The array devices operate in either active mode, passive mode, or stalled-active mode. The technique involves providing active-to-passive instructions to transition the source devices from active to passive while a host initially accesses host data from the source arrays using MPIO software (the target devices being in stalled-active mode), and monitoring whether the source devices successfully transition to passive during a predefined time period. If so, the technique involves operating the target devices in active mode and transferring data from the source devices to the target devices to enable the host to access the host data from the target arrays using the MPIO software. However, if a source device remains passive, the technique involves providing passive-to-active instructions to transition the source devices back to active to enable the host to access the host data from the source arrays.

26 Claims, 9 Drawing Sheets

| ARRAY ID | FA PORT NUMBER | ADDITIONAL INFORMATION (E.G., I/O COUNT, ERROR COUNT, DEVICE COUNTS, PATH STATES, ETC.) |
|---|---|---|
| 000190300124 | FA 15cA | . . . |
| 000190300124 | FA 15cB | . . . |
| 000190300124 | FA 15dA | . . . |
| 000190300124 | FA 15dB | . . . |

FIG. 2

| ARRAY ID | FA PORT NUMBER | ADDITIONAL INFORMATION (E.G., I/O COUNT, ERROR COUNT, DEVICE COUNTS, PATH STATES, ETC.) |
|---|---|---|
| 000190300124 | FA 15cA | . . . |
| 000190300124 | FA 15cB | . . . |
| 000190300124 | FA 15dA | . . . |
| 000190300124 | FA 15dB | . . . |
| 000190300124 | FA 15aA | . . . |
| 000190300124 | FA 15aB | . . . |
| 000190300124 | FA 15bA | . . . |
| 000190300124 | FA 15bB | . . . |

FIG. 4

| ARRAY ID | FA PORT NUMBER | ADDITIONAL INFORMATION (E.G., I/O COUNT, ERROR COUNT, DEVICE COUNTS, PATH STATES, ETC.) |
|---|---|---|
| 000190300124 | FA 15aA | . . . |
| 000190300124 | FA 15aB | . . . |
| 000190300124 | FA 15bA | . . . |
| 000190300124 | FA 15bB | . . . |

FIG. 6

MULTI-MACHINE ATOMIC SEAMLESS MIGRATION

BACKGROUND

Multipath I/O (MPIO) is a feature which provides a host with the ability to utilize multiple physical paths to a data storage array. In particular, if the host is unable to perform an I/O operation on the data storage array through one physical path, the host is able to retry the I/O operation on that array through another physical path. PowerPath® which is offered by EMC Corporation of Hopkinton, Mass. is an example of a multipathing software product.

After a data storage array has been in use for a period of time, the owner of the array may wish to replace that original array with a newer array, i.e., to migrate from the original array to a replacement array perhaps with more capacity, faster processors, newer components, additional features, etc. Open Replicator for Symmetrix (ORS), which is offered by EMC Corporation, is an example of a software product which facilitates creation of point-in-time copies of data to enable effective data migration from an original array to a replacement array while a host maintains online access to host data, i.e., online data migration. Another example is Symmetrix Remote Data Facility (SRDF) which is also offered by EMC Corporation. There are other replication software products available as well.

One conventional approach to online data migration involves making the replacement array available to a host even though some or all of the host data may have not yet been transferred to the replacement array from the original array. That is, the replacement array starts copying the host data from the original array (i.e., a background copy task), but behaves to the host as if all of the host data already resides on the replacement array. Along these lines, if the replacement array receives a host I/O request for particular host data that has not yet been copied from the original array, the replacement array immediately copies that host data in response to the I/O request, i.e., a copy-on-demand operation. Once the replacement array receives the requested host data from the original array, the replacement array provides that host data to the host as well as stores that host data thereafter. This process of "hot pulling" host data from the original array in response to host I/O requests can continue in conjunction with standard background data copying until all of the host data has been copied from the original array to the replacement array.

SUMMARY

Some data migration endeavors may impose special requirements. For example, suppose that a database owner stores a first portion of a particular database (or a first consistency group) on a first original array and a second portion of the database (or a second consistency group) on a second original array. Further suppose that the database owner wishes to migrate the first database portion from the first original array to a first new array, and the second database portion from the second original array to a second new array.

One migration approach is simple online migration in which the owner transfers the first and second database portions from the original arrays to the respective new arrays while a host maintains access to the database. In this approach, the owner independently performs (i) a first migration operation which transfers the first database portion from the first original array to the first new array, and (ii) a second migration operation which transfers the second database portion from the second original array to the second new array.

Since it is possible that one migration operation will successfully complete while the other migration operation encounters a problem and does not successfully complete, there may be risks associated with the simple online migration approach. For example, if the database is to remain accessible to the host during migration, it may critical for the owner to perform the first and second migration operations substantially simultaneously (e.g., within a minute, within two minutes, etc.) due to complexities of the particular database. Nevertheless, in this simple online migration approach, it is possible for only one migration operation to complete so that the host has online access to one new array while the other migration operation fails leaving the host with online access to the original array. Such a partial migration outcome could present significant problems to the database owner (e.g., database performance or corruption issues). As a result, the database owner may view this as an unacceptable potential situation and choose against applying the simple online migration approach.

Another migration approach is offline migration in which the database owner migrates the database portions from the original arrays to the respective new arrays while the arrays are offline to the hosts. In this approach, the database owner prohibits hosts from accessing the database while the owner performs both migration operations. Since the data is static (i.e., the host cannot change the data since the arrays are offline to it), it is unnecessary to perform the migration operations simultaneously. Accordingly, the offline migration approach offers greater safety, but at the very high cost of bringing the database offline during migration.

In contrast to the above-described approaches to data migration, improved techniques provide multi-machine atomic seamless migration. In particular, data migration from multiple source arrays to multiple target arrays occurs while a host runs multipath I/O (MPIO) software to maintain online access to host data. Due to smart management of the source and target arrays, the migration process is performed as an atomic operation in the sense that the process completes with either (i) all target arrays providing the host data or (ii) all source arrays providing the host data due to failing back to all of the source arrays in the event that a failure occurs during the migration process. That is, if at least one storage device of the multiple source arrays fails to transition from active mode to passive mode (as will be explained later) as part of the migration process, the migration process stops and the storage devices of the multiple source arrays transition back to active mode to enable the host to maintain online access to the host data via the multiple source arrays. However, if all of the source arrays properly transition from active mode to passive mode, the host can immediately access the host data via the multiple target arrays. Thus, the improved techniques are able to prevent host data access in a situation in which one source array successfully completes migration to a target array while another source array fails to complete migration to another target array.

One embodiment is directed to a method of migrating data from multiple source arrays to multiple target arrays. The storage devices of the arrays operate in either active mode or passive mode. The method includes providing active-to-passive instructions (e.g., small computer system interface or SCSI commands) to the multiple source arrays to transition the source devices from active to passive while a host initially accesses host data from the source arrays using MPIO software, and monitoring whether the source devices successfully transition to passive during a predefined time period. If so, the method includes operating the target devices in active mode and transferring data from the source devices to the target devices to enable the host to access the host data from the target arrays using the MPIO software. However, if at least one source device has not transitioned to passive, the method includes providing passive-to-active instructions to the multiple source arrays to transition the source devices back to active to enable the host to access the host data from the source arrays using the MPIO software.

Some embodiments are directed to a migration control server which communicates directly with the target arrays, and indirectly with the source arrays through the target arrays to carry out a multi-machine atomic seamless migration technique. In some arrangements, communications from the migration control server to the target arrays are in the form of system calls and SCSI commands. Furthermore, communications from the migration control server to the source arrays through the target arrays are in the form of system calls (i.e., a target array performs a short task which includes providing one or more SCSI commands to a source array in response to a system call).

Additionally, some embodiments are directed to a computer program product including a computer readable storage medium storing instructions which cause a computer to operate as the migration control server to carry out a multi-machine atomic seamless migration technique. In some arrangements, the instructions are compiled and linked executable code. In other arrangements, the instructions are scripts or rules which are dynamically translated and then performed by the computer.

Furthermore, some embodiments are directed to a data storage array which operates as one of the target arrays. Here, the data storage array is equipped to receive control signals from a migration control server and participate in a multi-machine atomic seamless migration process based on the control signals/commands.

Also, some embodiments are directed to a computer program product including a computer readable storage medium storing instructions which cause a data storage array to operate as a target array to carry out a multi-machine atomic seamless migration process based on control from the migration control server. In some arrangements, the instructions are compiled and linked executable code. In other arrangements, the instructions are scripts or rules which are dynamically translated and then performed by the target array.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 is a block diagram of information which is utilized by multipath software running on hosts of the computerized environment of FIG. 1 at an initial time.

FIG. 4 is a block diagram of information which is utilized by the multipath software running on the hosts during an intermediate time of the data migration procedure.

FIG. 6 is a block diagram of information which is utilized by the multipath software running on the hosts during a later time.

DETAILED DESCRIPTION

Overview

An improved technique provides multi-machine atomic seamless migration. Along these lines, data migration from multiple source arrays to multiple target arrays occurs while one or more hosts run multipath I/O (MPIO) software to maintain online access to host data. With smart management of the source and target arrays, the migration process is atomic in that the process completes with either (i) all target arrays providing the host data or (ii) all source arrays providing the host data (due to failing back to the source arrays). For example, if at least one storage device of the source arrays fails to transition from active mode to passive mode as part of the migration process, the migration process stops and the storage devices of the source arrays transition back to the active mode to enable each host to maintain online access to the host data via the source arrays. On the other hand, if all of the source arrays properly transition from the active mode to the passive mode, each host can immediately access the host data via the target arrays. As a result, the improved technique prevents an outcome in which the hosts have access to host data from both a target array and a source array.

Figure 1:
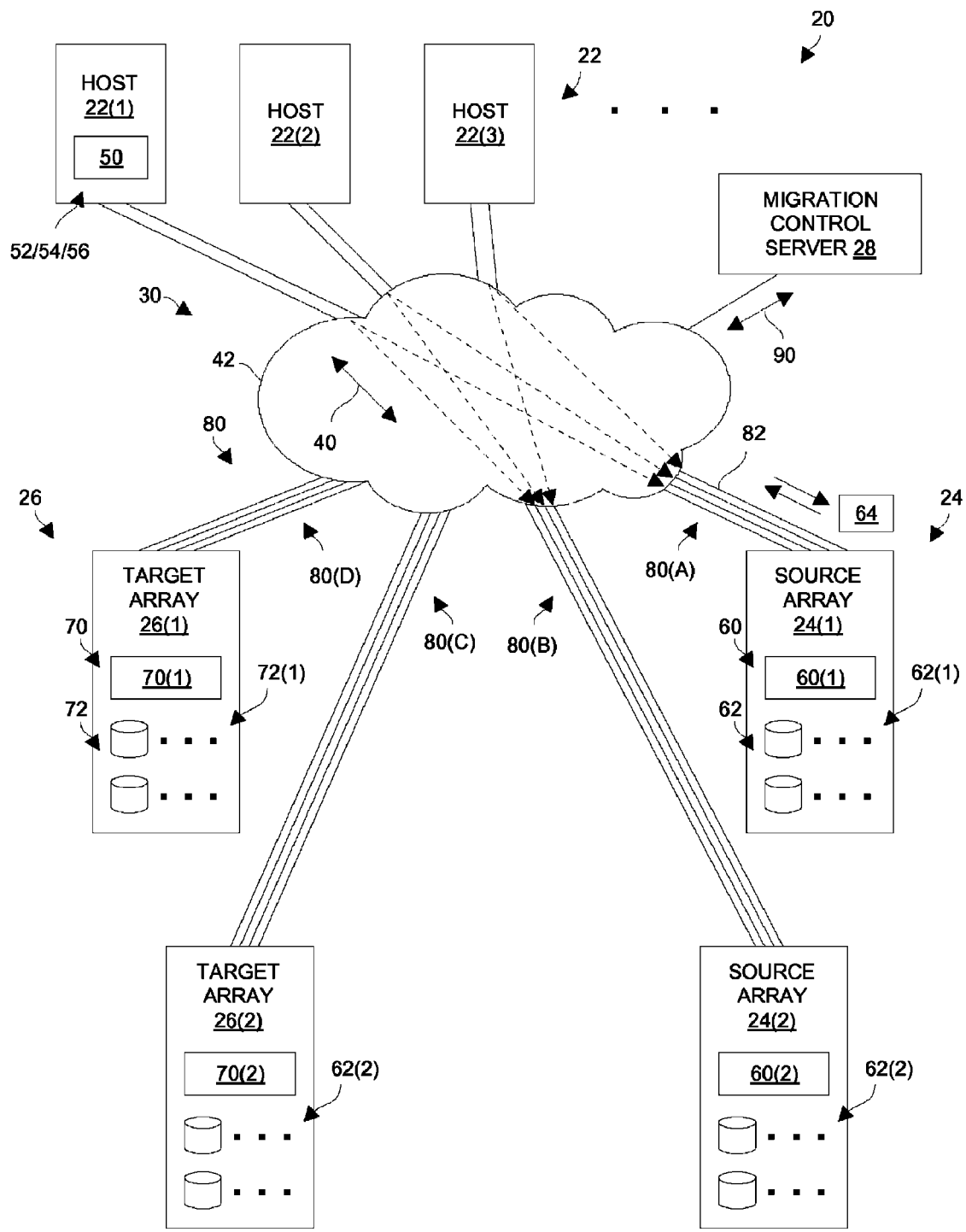
FIG. 1 is a block diagram of a computerized environment which employs multi-machine atomic seamless migration.

FIG. 1 is a block diagram of a computerized environment 20 which employs multi-machine atomic seamless migration. The computerized environment 20 includes hosts 22(1), 22(2), 22(3), . . . (i.e., collectively, hosts 22), source data storage arrays 24(1), 24(2), . . . (i.e., collectively, source arrays 24), target data storage arrays 26(1), 26(2), . . . (i.e., collectively, target arrays 26), a migration control server 28, and a communications medium 30.

The communications medium 30 is constructed and arranged to convey electronic signals 40 between the various components of the computerized environment 20. Along these lines, the communications medium 30 may implement a variety of protocols such as small computer system interface (SCSI), Fibre Channel, FICON, TCP/IP, Ethernet, combinations thereof, and the like. Furthermore, at least part of the communications medium 30 is illustrated as a network cloud 42 since the communications medium 30 (i) may include various additional components (e.g., cables, switches, gateways/bridges, other SAN/NAS communications devices and interfaces, etc.) and (ii) is capable of having a variety of topologies (e.g., switched fabric, hub-and-spoke, ring, backbone, multi-drop, point-to-point, irregular, combinations thereof, etc.).

Each host 22 (e.g., see host 22(1)) includes computerized circuitry 50 (e.g., a set of processors, memory, host bus adaptors, etc.) which is constructed and arranged to perform host input/output (I/O) operations on the arrays 24, 26. To this end, each host 22 is equipped with a variety of software constructs (see host 22(1)) including an operating system 52, multipath I/O software 54, and other applications 56 (e.g., a database application).

Furthermore, each source array 24 includes source array processing circuitry 60, and source storage devices 62 (i.e., source devices) which initially store host data 64 which is accessed by the hosts 22. For example, the source array 24(1) includes source array processing circuitry 60(1), and source devices 62(1). Additionally, the source array 24(2) includes source array processing circuitry 60(2), and source devices 62(2), and so on. For illustration purposes only, the host data 64 is shown in FIG. 1 as a block exchanged between a host 22 and the source array 24(1). It should be understood that the host data 64 initially resides in a distributed manner across the source devices 62 of all of the source arrays 24.

Similarly, each target array 26 includes target array processing circuitry 70, and target storage devices 72 (i.e., target devices). For example, the target array 26(1) includes target array processing circuitry 70(1), and target devices 72(1). Furthermore, the target array 26(2) includes target array processing circuitry 70(2), and target devices 72(2), and so on.

In some arrangements, the processing circuitry 60, 70 of one or more of the arrays 24, 26 includes front-end adaptors (FAs), a cache (e.g., global memory), and disk adaptors (DAs). In these arrangements, the FAs (which are sometimes referred to as front-end directors or host adaptors) operate as interfaces between the hosts 22 and the cache. Similarly, the DAs (which are sometimes referred to as back-end directors or disk controllers) operate as interfaces between the cache and the storage devices 62, 72. For these arrangements, appropriately configured Symmetrix® storage systems which are provided by EMC Corporation of Hopkinton, Mass. are suitable for use as one or more of the data storage arrays 24, 26.

As shown in FIG. 1, multiple physical links 80 (e.g., four physical links) lead to each array 24, 26. In particular, multiple physical links 80(A) lead to multiple FA ports of the source array 24(1), and multiple physical links 80(B) lead to multiple FA ports of the source array 24(2). Similarly, multiple physical links 80(C) lead to multiple FA ports of the target array 26(2), and multiple physical links 80(D) lead to multiple FA ports of the source array 26(1).

Each array 24, 26 is equipped with an array identification number (i.e., an array ID). Additionally, within each array 24, 26, each FA port has a FA port identification number (i.e., a FA port number). The hosts 22 coordinate their access to the various arrays 24, 26 and their storage devices 62, 72 using uniquely named logical pathnames 82 (or channels), i.e., unique combinations of array IDs and FA port numbers.

FIG. 2 shows, by way of example, a host's initial view of available logical pathnames 82 to the source array 24(1). This logical pathname information is preferably stored and managed by the MPIO software 54 running on the host 22. As shown, the source array 24(1) uses an array ID of "000190300124" and FA port numbers "15cA", "15cB", "15dA" and "15 dB". The various combinations of the array ID and the different FA port numbers result in four uniquely identifiable logical pathnames 82 for each host 22 to utilize when communicating with the source array 24(1). As shown in further FIG. 2, each host 22 may monitor and maintain additional logical pathname information as well, such as I/O statistics per pathname, error statistics per pathname, device counts, and path states, among other things.

Each host 22 routinely updates its view of what logical pathnames 82 and data storage resources are currently available in the environment 20. Accordingly, each host 22 stores and manages similar logical pathname information for the source array 24(2) as well. However, at least initially, the target arrays 26 are not online and thus are not yet visible to the hosts 22.

In connection with the storage devices 62, 72 of the arrays 24, 26, it should be understood that, in some arrangements, the storage devices 62, 72 are physical devices. Such physical devices may include non-volatile memory storage units such as magnetic disk drives, flash memory drives, and so on.

However, in other arrangements, the storage devices 62, 72 are not physical device but are logical devices which correspond to identifiable actual physical storage within the arrays 24, 26. Examples of suitable logical devices are logical units (or volumes). Each logical unit is identifiable by a logical unit number (LUN), and corresponds to specific storage such as a portion of a physical device, a particular physical device, multiple physical devices, portions or stripes across multiple physical devices, multiple logical devices, and so on.

The processing circuitry 60, 70 of the arrays 24, 26 is constructed and arranged to present, to the hosts 22, each storage device 62, 72 as operating in either an active mode or a passive mode. In active mode, a storage device 62, 72 is able to perform host read/write I/O operations (e.g., SCSI read or write operations to access host data 64) in response to host read/write I/O requests, as well as host control operations (e.g., respond to inquiry and mode sense SCSI commands from the hosts 22).

In passive mode, a storage device 62, 72 is only able to perform host control operations (e.g., inquiry, mode sense, read capacity, etc.). If a storage device 62, 72 receives a host read/write I/O request while in passive mode, that storage device 62, 72 immediately responds with an error message (e.g., responds with a check condition status code) and does not perform the requested read/write I/O operation.

Additionally, the processing circuitry 70 of the target arrays 26 is constructed and arranged to provide a "stalled-active" behavior (to be further explained shortly) for the storage devices 72 of the target arrays 26 in which the hosts 22 perceive the target devices 72 as being in active mode. Accordingly, the hosts 22 continue to operate as if the target devices 72 are able to properly perform host read/write I/O operations in response to host read/write I/O requests.

In particular, when the processing circuitry 70 of the target arrays 26 operate the target devices 72 of the target arrays 26 in stalled-active mode, the hosts 22 are able to send control requests (e.g., inquiry and mode sense SCSI commands) to the target devices 72 and immediately receive back status responses from the target devices 72 and the processing circuitry 70 (e.g., a "success" status code perhaps with additional status information).

However, if a host 22 sends a host read/write I/O request to a target device 72 while the target device 72 is in the stalled-active mode, the host 22 does not immediately receive back a response. Rather, the processing circuitry 70 delays (or stalls) for up to a predefined time limit (e.g., 20 seconds). Such stalling provides time for certain "under the hood" operations to complete but still preserves the hosts' view of the target device 72 being in active mode, i.e., the hosts 22 do not see the target devices 72 reject read or write commands. Such under the hood operations may include waiting for the source devices 62 of the source arrays 24 to transition from the active mode to the passive mode, and subsequently for the target devices 72 of the target arrays 26 to transition from the passive mode to the active mode. Although the host 22 does not receive a subsequent I/O-related message (e.g., a data frame, a transfer ready frame, etc.) from the target devices 72, the simple but delayed response from the target devices 72 in stalled-active mode enables the hosts 22 to maintain normal and smooth operation.

Accordingly, operating the target devices 72 in stalled-active mode while the source devices 62 are transitioning from active mode to passive mode is useful since it prevents a situation in which both source devices 62 and corresponding target devices 72 are simultaneously in passive mode. In some arrangements, the processing circuitry 70 simply sends back an acceptable status response at the end of the predefined time limit (e.g., a task aborted status code which may cause the requesting host 22 to retry the host I/O operation). In other arrangements, if the under the hood operation completes and leaves enough time for the processing circuitry 70 to carry out the host I/O operation, the processing circuitry 70 transitions the target device 72 from stalled-active mode to active mode, completes the I/O operation on the target device 72, and then sends an acceptable status response before the host I/O request times out (i.e., a timeout would signal that there is a problem).

Prior to migration and as shown in FIG. 1, the hosts 22 are able to perform I/O operations on the source arrays 24 through the communications medium 30 (e.g., see the dashed lines within the cloud 42). Here, each source storage device 62 of the source arrays 24 is initially in the active mode. Along these lines, each host 22 runs the MPIO software 54 which is appropriately configured (i.e., established switch zones, established logical pathnames, etc.) to robustly and reliably enable the host applications 56 to access the host data 64 distributed across the source arrays 24.

For example, the applications 56 running on the hosts 22 may include a database application, and portions of the database initially may be distributed across multiple machines. In particular, one portion of the database initially may reside in the source array 24(1) while another portion of the database initially resides in the source array 24(2).

While the hosts 22 have online access to the source arrays 24, the migration control server 28 is capable of communicating with various components of the computerized environment 20 through the communications medium 30, i.e., see the arrow 90 in FIG. 1. For example, the migration control server 28 can communicate directly with the target arrays 26 using system calls. Here, it is assumed that the target arrays 26 are contemporary machines which are constructed and arranged to receive and implement configuration instructions from the migration control server 28 as well as properly respond to such instructions, e.g., to provide operational status of the individual target devices 72.

Additionally, the target arrays 26 and the source arrays 24 are constructed and arranged to communicate with each other directly through the communications medium 30. Along these lines, the target arrays 26 are able to exchange data with the source arrays 24 directly, and to provide control instructions to the source arrays 24. For example, the target arrays 26 are able to provide standard SCSI commands to the source arrays 24, as well as receive standard SCSI responses (e.g., SCSI status codes) from the source arrays 24. Accordingly, it is not necessary that the migration control server 28 be able to communicate directly with the source arrays 24 although such a situation may be possible.

Rather, if the source arrays 24 are not equipped to handle system calls from the migration control server 28 directly, the migration control server 28 is able to control the source arrays 24 via system calls and/or SCSI commands to the target arrays 26. In turn, target arrays 26 send standard commands and/or vendor-unique commands to the source arrays 24 (i.e., command tunneling). Similarly, the migration control server 28 can receive status from the source arrays 24 by configuring the target arrays 26 to relay status that the target arrays 26 obtain from the source arrays 24 (perhaps with additional information) as the source arrays 24 respond to the standard commands from the target arrays 26.

As will now be explained in further detail, the migration process will result in successful data migration to all target arrays 26 or fail back to all source arrays 24. Due to this atomic migration behavior while the hosts 22 maintain online access to the host data 64, the hosts 22 perceive the migration process as a multi-machine atomic seamless migration operation. In particular, such operation avoids a potential data performance issue in which a host 22 would otherwise obtain direct online access to a target array and a source array.

Migration Process Details

Figure 3A:
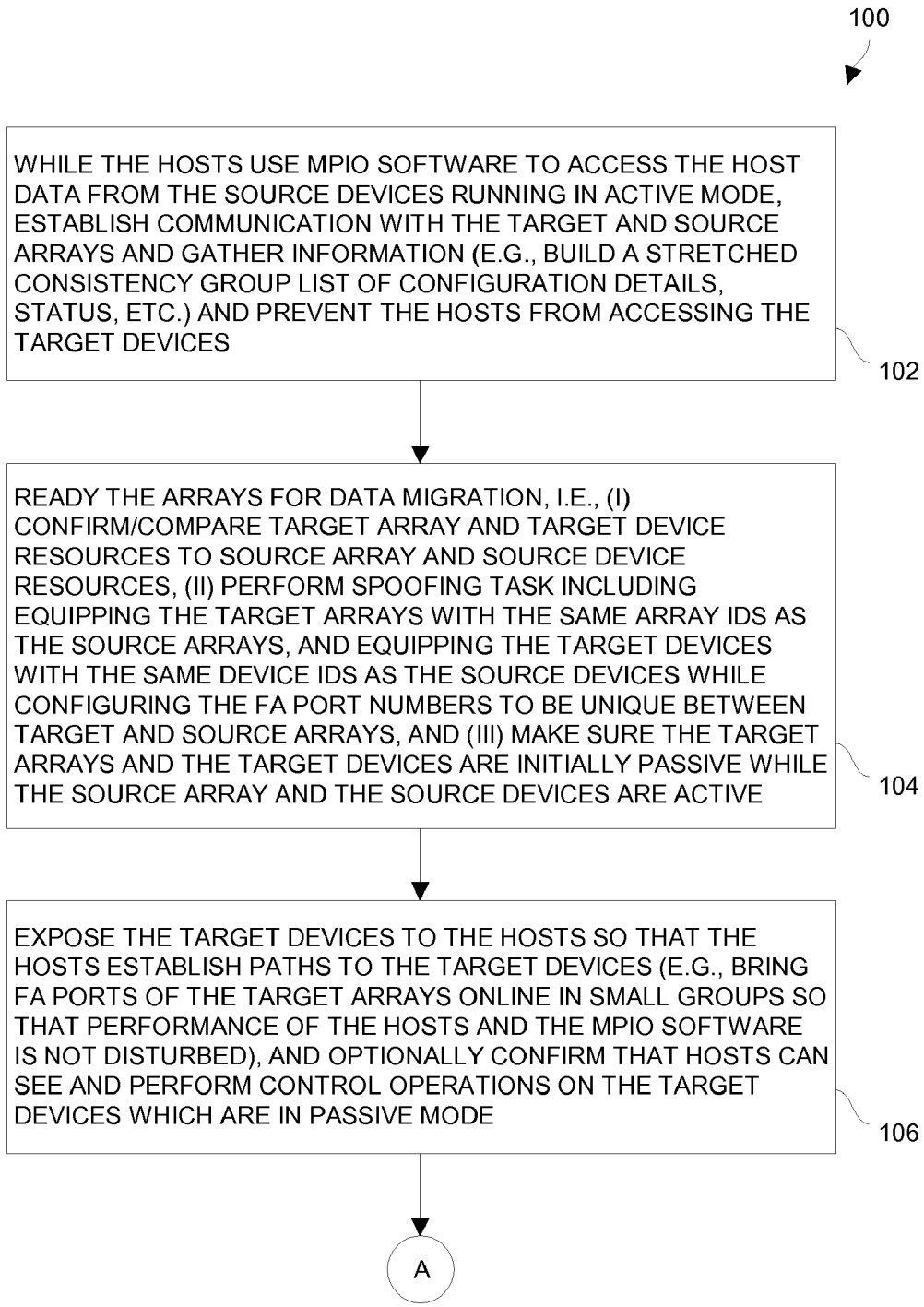
FIG. 3a is a first flowchart portion of a data migration procedure which is performed by components of the computerized environment of FIG. 1.
Figure 3B:
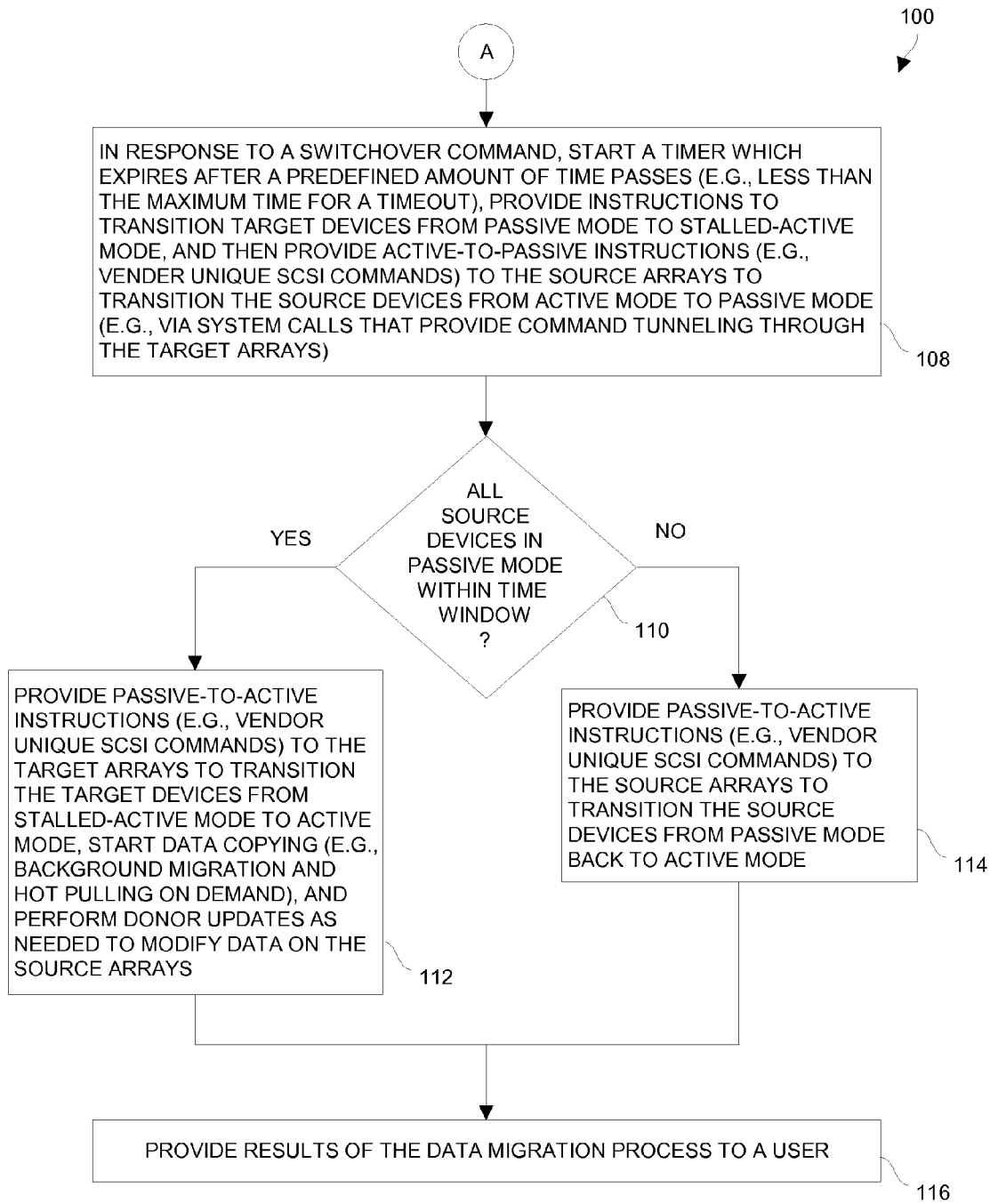
FIG. 3b is a second flowchart portion of the data migration procedure which is performed by components of the computerized environment of FIG. 1.

FIGS. 3a and 3b show a flowchart of a procedure 100 for providing atomic seamless data migration from the source arrays 24 to the target arrays 26 (also see FIG. 1). Such a data migration process is guided by the migration control server 28 which is able to issue instructions to impose migration control over the arrays 24, 26 in parallel as well as monitor their status.

As mentioned above, in some arrangements, the migration control server 28 communicates directly with the target arrays 26, and indirectly with the source arrays 24 through the target arrays 26 (i.e., command tunneling). Such arrangements alleviate the potential need for the source arrays 24 to be fully compliant with any contemporary protocols or application programming interfaces (APIs) that are currently utilized by the migration control server 28 (e.g., the source arrays 24 may be legacy equipment or may be running legacy software).

Initially, as illustrated in step 102 (FIG. 3a), the migration control server 28 establishes communications with the source and target arrays, 24, 26 and gathers information from both arrays 24, 26 (e.g., queries the arrays 24, 26 for configuration information and status). In particular, the migration control server 28 builds a list of storage device entries to monitor and coordinate the operation of the storage devices 62, 72. Along these lines, the migration control server 28 learns the array IDs, the FA port numbers, and the device IDs, as well as other configuration information, from the source arrays 24, e.g., indirectly via command tunneling through the target arrays 26 using inquiry and mode sense SCSI commands, among others. This initial data gathering task may be performed by the migration control server 28 in an automated manner, e.g., an automatic discovery routine. Alternatively, the task may be performed manually by a user of the migration control server 28.

It should be understood that the migration control server 28 is constructed and arranged to treat all of the source devices 62 of all of the source arrays 24 as belonging to a "stretched" consistency group. That is, the migration control server 28 manages a set of consistency group rules and views the source devices 62 of the source arrays 24 as one consistency group even through the source devices 62 are distributed across multiple machines, i.e., multiple source arrays 24. Accordingly, the migration control server 28 will now work to switch host access to all of the target devices 72 of all of the target arrays 26 or fail back to all of the source devices 62 of all of the source arrays 24 in an atomic manner. As a result, an outcome of a host being able to access host data directly from a target array and a source array is avoided.

During step 102, the migration control server 28 allows the hosts 22 to continue to enjoy robust and reliable communication with the source arrays 24 using the MPIO software 54 (also see dashed lines in FIG. 1). Along these lines, the source arrays 24 operate the source devices 62 in active mode and provide the hosts 22 with highly available access to the host data 64 through multiple established logical pathnames 82 (i.e., identified by array IDs and FA port numbers) for fault tolerant redundancy (also see the established logical pathname information for the source array 24(1) in FIG. 2).

At this initial point, the target arrays 26 may be powered up. However, the target arrays 26 are awaiting configuration in the sense that they may not yet be equipped with array IDs and FA port numbers. Moreover, although the host data 64 is distributed across the source devices 62 of the source arrays 24, no host data currently resides on the target devices 72 of the target arrays 26. Accordingly, all of the FA ports of the target arrays 26 are offline to prevent the hosts 22 from having any access to the target devices 72.

In step 104, the migration control server 28 readies the target arrays 26 to replace the source arrays 24. That is, the migration control server 28 confirms that the target array 26(1) is at least as well provisioned as the source array 24(1). In particular, the migration control server 28 verifies that there are at least as many target devices 72 in the target array 26(1) as there are source devices 62 in the source array 24(1), and that the respective storage capacities of the target devices 72 are at least as great as the storage capacities of the source devices 62. Similarly, the migration control server 28 confirms that the target array 26(2) is at least as well provisioned as the source array 24(2).

Additionally, in step 104, the migration control server 28 performs a spoofing configuration task. In particular, the migration control server 28 configures the target array 26(1) to use the same array ID as the source array 24(1). Similarly, migration control server 28 configures the target array 26(2) to use the same array ID as the source array 24(2), and so on. However, the migration control server 28 purposely configures the FA port numbers of the target arrays 26 to use different FA port numbers than those used by the corresponding source array 24.

Furthermore, the migration control server 28 configures the target devices 72 of the target array 26(1) with the same device IDs as the source devices 62 of the source array 24(1) (e.g., by referencing and updating its managed list of storage devices). Likewise, the migration control server 28 configures the target devices 72 of the target array 26(2) with the same device IDs as the source devices 62 of the source array 24(2), and so on. As a result, the device IDs of the source devices 62 and the target devices 72 are now the same.

These ID matching tasks are referred to as spoofing since these tasks will enable the hosts 22 to concurrently communicate with source arrays 24 and target arrays 26. For example, the hosts 22 will view the source array 24(1) and the target array 26(1) simply as a single augmented array offering many logical pathnames 82 some of which may only be available in passive mode. Since each logical pathname 82 is a combination of an array ID and a FA port number, it should be understood that the FA port numbers used by the target arrays 26 are different than the FA port numbers used by the source arrays 24 to maintain uniqueness among the logical pathnames 82. As will be explained in further detail shortly, such spoofing enables the hosts 22 to smoothly transition their access from the source devices 62 to the target devices 72 in a seamless manner.

The migration control server 28 confirms that the target devices 72 of the target arrays 26 are initially in passive mode. If not, the migration control server 28 has the capability of transitioning the target devices 72 to passive mode.

In step 106, the migration control server 28 puts all of the target devices 72 in passive mode and brings the FA ports of the target arrays 26 online. The migration control server 28 then exposes the target devices 72 to the hosts 22. In response, MPIO software 54 running on the hosts 22 establishes new logical pathnames 82 to the target arrays 26. Preferably, the migration control server 28 introduces the FA ports of the target arrays 26 and the target devices 72 to the hosts 22 incrementally, or in small groupings. As a result, the hosts 22 discover and establish the new logical pathnames 82 to the target devices 72 gradually so that performance of the hosts 22 and the MPIO software 54 running on the hosts 22 is not disrupted.

FIG. 4 shows, by way of example, the hosts' view (i.e., information maintained by the MPIO software 54) after the new FA port numbers for the target array 26(1) are introduced. As shown, the migration control server 28 has configured the target array 26(1) to present the same array ID of "000190300124" but different FA port numbers "15aA", "15aB", "15bA" and "15bB". Accordingly, the combinations of the array ID and the FA port numbers results in four new uniquely identifiable logical pathnames 82 for the hosts 22 to utilize. However, these four new logical pathnames 82 refer to the target array 26(1) rather than the source array 24(1). Nevertheless, since the combinations of array ID and FA port numbers now result in eight unique logical pathnames 82, the hosts 22 will be able to properly distinguish and coordinate their use of the logical pathnames 82 to the arrays 24, 26.

Other logical pathname information is added to the hosts' views as the other target array FA ports are brought online. As a result of step 106, the hosts 22 now have updated views of all eight logical pathnames 82 relating to the source and target arrays 24(1), 26(1), as well similar information for other source and target arrays, e.g., for the source and target arrays 24(2), 26(2).

Following step 106, the migration control server 28 can optionally communicate with the hosts 22 to confirm that the hosts 22 have properly created logical pathnames 82 for the target devices 72. For example, the migration control server 28 can direct each host 22 to perform inquiry and mode sense SCSI commands with the target arrays 26 to verify that the hosts 22 can see and perform control operations on the target devices 72 which are in passive mode. However, if a host 22 sends a read/write I/O request to any of the target arrays 26, the host 22 receives a failure response (e.g., a check condition status code) perhaps causing the host 22 to retry the I/O operation down a different path leading to a source array 24.

The source and target arrays 24, 26 are now ready to enter an atomic switchover portion of the migration process in which either all of the source arrays 24 directly provide access to the host data 64, or all of the target arrays 26 directly provide access to the host data 64. Up to this point, the hosts 22 have maintained access to the host data 64 from the source arrays 24. That is, all of the source devices 62 are currently in active mode in parallel. In contrast, the target devices 72 of the target arrays 26 can now communicate with the hosts 22 (e.g., the target devices 72 offer the same pre-presentation as the source devices 62), but the target devices 72 are currently in passive mode and do not have the host data 64. Preferably, the switchover portion of the process is conducted during a period of relatively low activity (e.g., at a time of the day or week where there is only light or low traffic from the hosts 22).

With reference back to the migration procedure 100 (FIG. 3b), in step 108, the migration control server 28 receives a switchover command from the user and, in response, starts a timer and provides migration instructions for all of the storage devices 62, 72 in the stretched consistency group (also see FIG. 2). In particular, the switchover command triggers the migration control server 28 to instruct all of the target arrays 26 to transition their target devices 72 from passive mode to the stalled-active mode, and then all of the source arrays 24 to transition their source devices 62 from active mode to passive mode.

The timer is constructed and arranged to expire after a predefined amount of time passes (e.g., 15 seconds). That is, the timer defines a time window for all of the source devices 62 to transition from active mode to passive mode. Since it may be desirable for to migrate from the source arrays 24 to the target arrays 26 within one I/O cycle, the amount of time within this time window is preferably set to be below the maximum amount of time allowed to complete a host I/O operation so that the hosts 22 lose at the most, one I/O cycle. Along these lines, if the maximum amount of time for a host I/O operation to complete is 30 seconds before timing out, a time window of 15 seconds is well-suited for enabling the source devices 62 to become passive and the target devices 72 to become active.

In some arrangements, the migration control server 28 sends system calls to the target arrays 26. In response to a particular system call, each target array 26 (i) transitions a particular target device 72 to become stalled-active and (ii) subsequently sends an active-to-passive instruction to a corresponding source array 24 directing a particular source device 62 to become passive (i.e., command tunneling). Accordingly, the target device 72 transitions from passive mode to the stalled-active mode before the corresponding source device 62 transitions from active mode to passive mode. The active-to-passive instruction may be a vendor unique SCSI command that the source array 24 is capable of handling even if the source array 24 is legacy equipment.

In other arrangements, the migration control server 28 sends (i) separate active-to-passive instructions (e.g., vendor unique SCSI commands one at a time) to the source arrays 24 to individually transition each source device 62 from active mode to passive mode, and (ii) additional transition instructions to the target arrays 26 to transition each target device 72 from passive mode to stalled-active mode. Each active-to-passive instruction to a source device 62 receives a response indicating whether the transition was or was not successful. Similarly, each transition instruction to a target device 72 receives a response indicating whether the transition was or was not successful.

It should be understood that a source device 62 on a source array 24 is unable to perform further host read/write I/O operations once it transitions from active mode to passive mode. In particular, the corresponding source array 24 blocks any new host read/write I/O requests as well as any new reservations to the particular source device 62. Along these lines, if a host 22 sends a read/write I/O request to a source device 62 which is now in passive mode, the host 22 will receive an error response (e.g., check condition status) and will likely resend the same read/write I/O request down a different path perhaps leading to a target array 26 (i.e., the host 22 retries the I/O request).

Similarly, the target array 26 provides a stalled-active behavior for any new host I/O requests to the particular target device 72. Along these lines, if a host 22 sends an I/O request to a target device 72 which is now in stalled-active mode, the response to the host 22 is delayed up to a predefined amount of time. Eventually, the host 22 receives an acceptable response from the target device 72 (e.g., command aborted status) and will likely retry the same I/O request perhaps at a time in which the target device 72 is available in active mode.

In step 110, the migration control server 28 checks to see whether all of the source devices 62 properly transitioned from active mode to passive mode. Here, the migration control server 28 polls the source devices 62 individually either directly or indirectly through the target arrays 26 (i.e., command tunneling). The migration control server 28 may also poll the target arrays 26 for transition status of the target devices 72.

In some arrangements, the migration control server 28 waits until the timer expires and then checks to see if there is still at least one source device 62 remaining in active mode. In other arrangements, the migration control server 28 updates a locally managed list of storage devices 62, 72 of the arrays 24, 26 and, as soon as the migration control server 28 detects that all of the source devices 62 are in passive mode, the migration control server 28 proceeds further even if the timer has not yet expired. If all of the source devices 62 of the source arrays 24 transition from active mode to passive mode within the predefined amount of time, step 110 proceeds to step 112. However, if there is at least one source device 62 which failed to transition from active mode to passive mode and if the timer has now expired, step 110 proceeds to step 114.

In step 112, since all of the source devices 62 of the source arrays 24 are now in passive mode, the migration control server 28 instructs the target arrays 26 to transition their target devices 72 from stalled-active mode to active mode in parallel (i.e., for the entire stretched consistency group). In some arrangements, the migration control server 28 sends separate transition instructions (e.g., vendor unique SCSI commands) to the target arrays 26 to individually transition each target device 72 from stalled-active mode to active mode. Each transition instruction receives a response indicating whether the transition was or was not successful.

Additionally, in step 112, the migration control server 28 instructs the arrays 24, 26 to begin background data copying and hot pulling operations as necessary. Furthermore, the migration control server 28 instructs the target arrays 24 to perform donor updates as necessary in order to keep the data on the source arrays 24 fully updated, i.e., the source arrays 24 maintain a fully updated copy of the host data 64 at all times.

Figure 5:
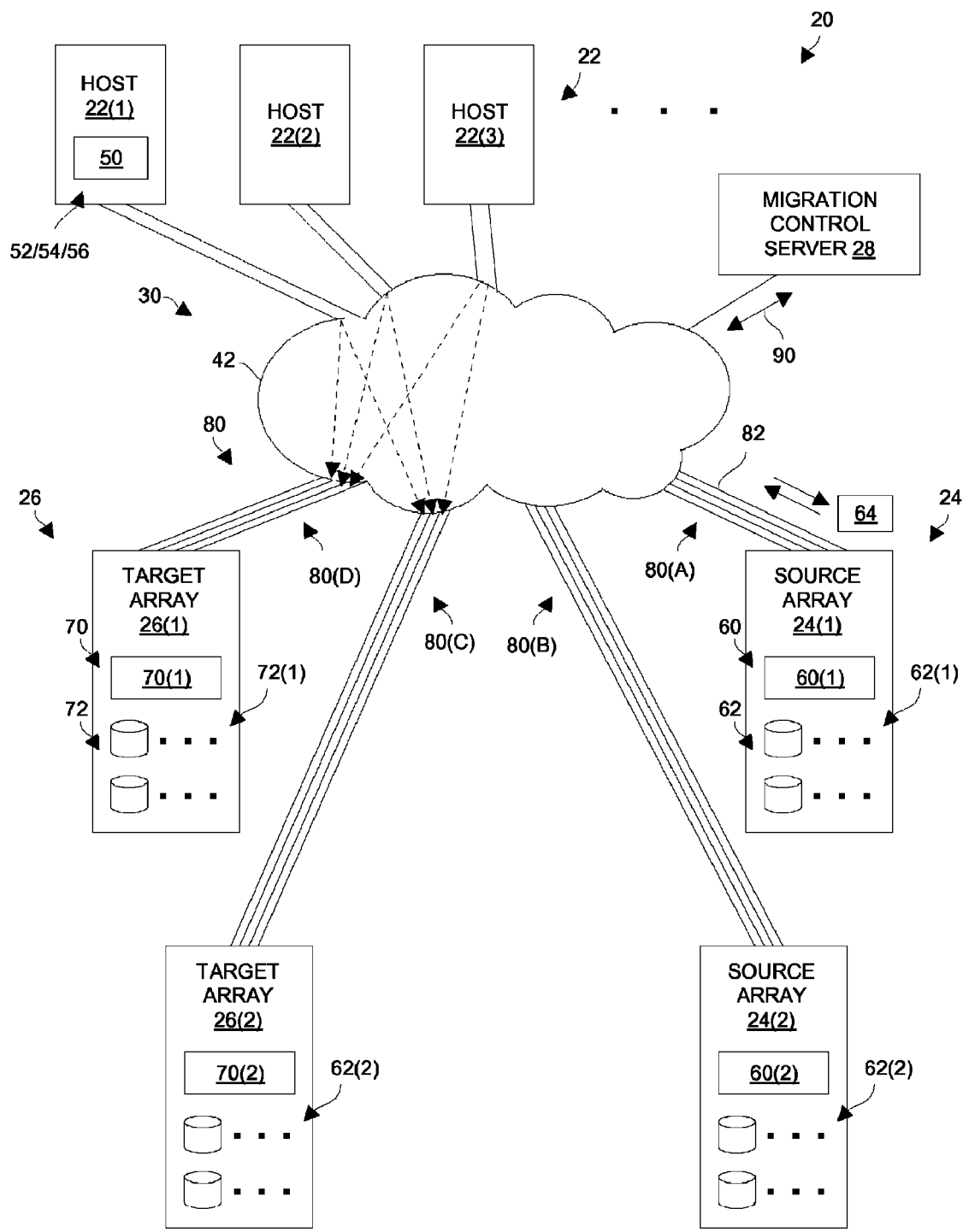
FIG. 5 is a block diagram of the computerized environment after (i) source devices of source arrays have transitioned to passive mode and (ii) target devices of target arrays have transitioned to active mode.

FIG. 5 shows the hosts 22 as now being able to perform I/O operations on the target arrays 26 through the communications medium 30 (e.g., see the dashed lines within the cloud 42). In particular, the target devices 72 are now in active mode to receive and process host read/write I/O requests, and the source devices 62 are in passive mode unable to respond to host read/write I/O requests.

Also, as part of step 112, the migration control server 28 directs the target arrays 26 to start background data copying. In response, the target arrays 26 perform host I/O operations as higher priority tasks, and begin copying the host data 64 from the source devices 62 to the target devices 72 as lower priority background tasks until all of the data is copied from the source arrays 24 to the target arrays 26. If a target array 26 does not have the host data 64 identified by a particular host I/O request, the target array 26 performs a copy on demand operation from the appropriate source device 62, i.e., the target array 26 "hot pulls" the particular host data 64 from the appropriate source array 24 and provides that host data 64 to the host in response to the I/O request as if the host data 64 had already resided on the target array 26. The target array 26 is then able to save the hot-pulled host data 64 locally thus alleviating the need to re-copy the host data 64 from the source array 24 at a later time. Once the target arrays 26 have copied all of the data from the source arrays 24, step 112 then proceeds to step 116.

It should be understood that some of the host I/O operations performed by the target arrays 26 may be write operations in which existing host data 64 is updated (e.g., read-modify-write) or new host data 64 is written to the target devices 72.

While performing these write operations, the target arrays 26 concurrently provide donor update instructions to the source arrays 24 which direct the source arrays 24 to perform the same write operations while the source devices 62 are in passive mode. That is, although the source devices 62 are technically in the passive mode with respect to I/O requests directly from the hosts 22, the source devices 62 are still configured to process I/O requests from the target arrays 26, i.e., the donor update instructions. A target array 26 preferably does not acknowledge to a host 22 that a write operation has successfully completed until it receives a confirmation that the donor update instruction to the corresponding source array 24 has been completed as well.

Since the source arrays 24 have an up-to-date version of all of the host data 64 as a result of the donor update operations, if there is a failure during the migration process, the hosts 22 will be able to regain access the host data 64 from the source arrays 24. For example, if communications to the target arrays 26 is lost, the source arrays 24 are equipped to offer a complete up-to-date version of the host data 64. Accordingly, no host data 64 is lost regardless of the outcome.

In step 114, since at least one of the source device 62 remains in active mode, the migration control server 28 does not switchover any host access from the source arrays 24 to the target arrays 26. Rather, the migration control server 28 provides an atomic behavior by failing back to the source arrays 24 for host access. That is, the migration control server 28 instructs the source arrays 24 to transition their source devices 62 from passive mode back to active mode (e.g., by sending vendor unique SCSI commands to the source arrays 24), and instructs the target arrays 26 to transition the target devices 72 from stalled-active mode to passive mode.

In some arrangements, the migration control server 28 sends separate passive-to-active instructions (e.g., vendor unique SCSI commands) to the source arrays 24 (through the target arrays 26) to individually transition each source device 62 from passive mode back to active mode. Each passive-to-active instruction receives a response indicating whether the transition was or was not successful. Once all of the source devices 62 have transitioned back to active mode, step 114 proceeds to step 116.

In step 116, the migration control server 28 provides the results of the migration process to a user. If the migration process is successful, the hosts 22 are now able to access the host data 64 from the target arrays 26. However, if the migration process is unsuccessful, the host 22 are still able to access the host data 64 from the source arrays 24, and the user will be able to identify which source devices 62 were unable to properly transition and then re-attempt the migration.

If the migration process is successful, the target devices 72 of the stretched consistency group are now available via the target arrays 26, i.e., data has now fully migrated from the source devices 62 of the source arrays 24 to the target devices 72 of the target arrays 26. At this time, the user may then perform some additional housekeeping (i.e., cleanup) tasks to remove switch zones and logical pathnames 82 which are no longer in use. For example, once the data is fully migrated from the source arrays 24 to the target arrays 26, the original logical pathname information can be removed from the hosts 22.

FIG. 6 shows, by way of example, the hosts' view of the source array 24(1) at the end of the migration process. Here, the MPIO software 54 has deleted the original logical pathname information so that only the array ID of "000190300124" and FA port numbers "15aA", "15aB", "15bA" and "15bB" remain.

If the migration process is unsuccessful, the user may assess what source devices 62 failed to transition to passive mode from the migration results, and attend to remedying the situation. The user is then able to re-perform the migration process using the migration control server 28.

Since the switchover portion of the migration process was handled atomically (i.e., either the hosts 22 access all of the target arrays 26 or all of the source arrays 24), there is no opportunity for a host 22 to concurrently have online read/write access to a source array 24 and online read/write access to a target array 26. Accordingly, the multi-machine online seamless migration process avoids a partial migration outcome which could otherwise present significant problems (e.g., database corruption issues).

Migration Control Server Details

Figure 7:
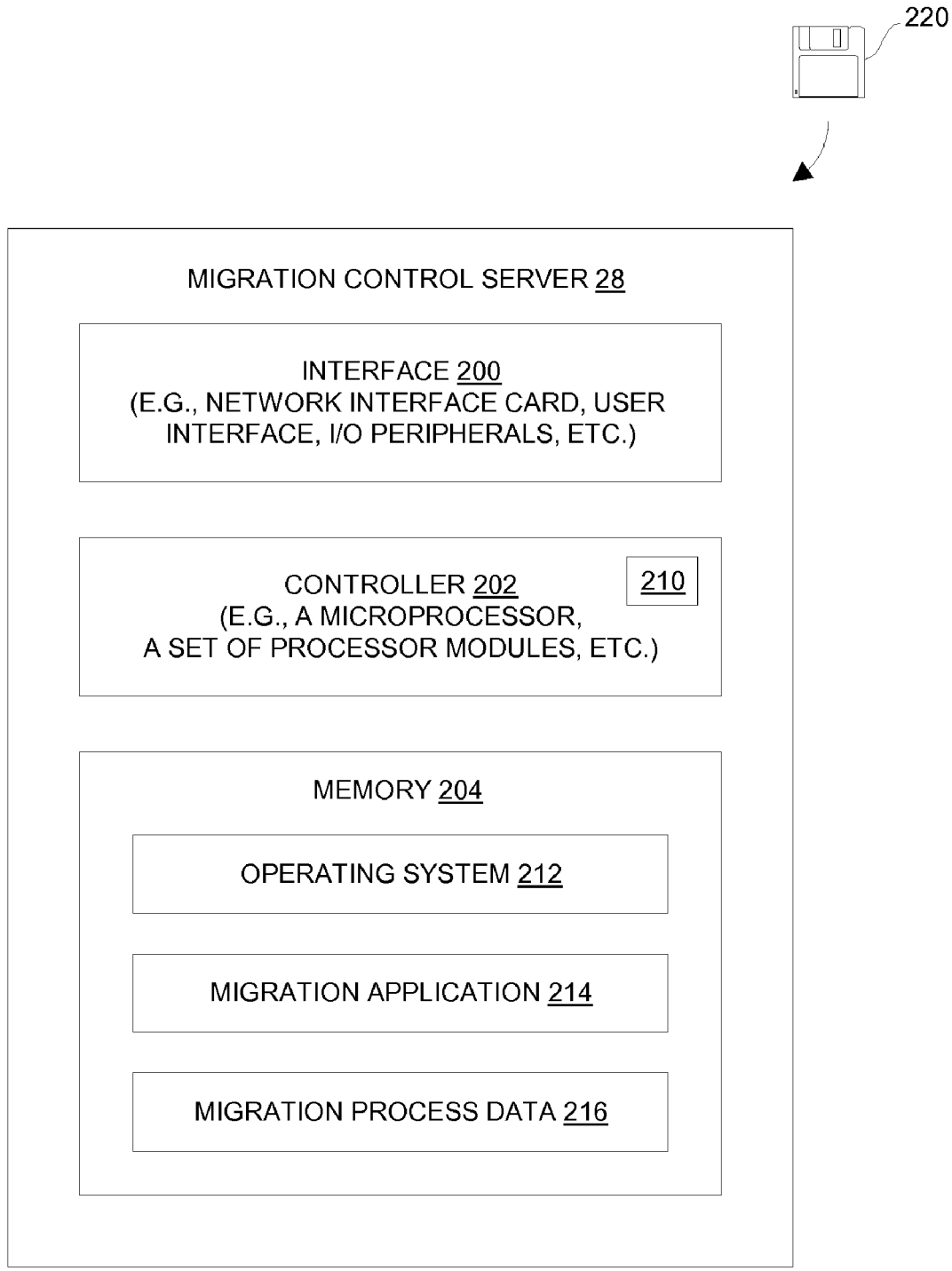
FIG. 7 is a block diagram of a migration control server of the computerized environment of FIG. 1.
Figure 8:
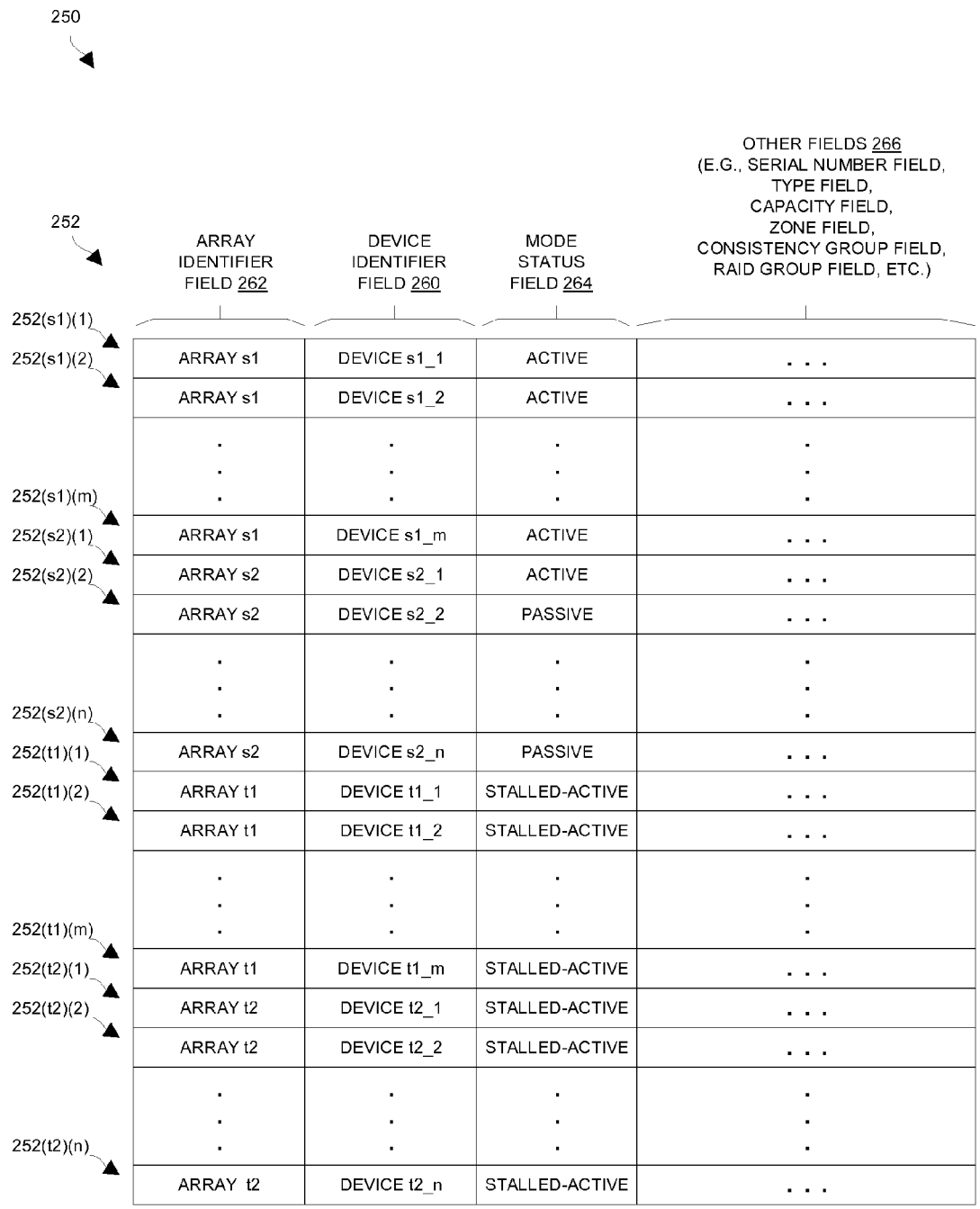
FIG. 8 is a block diagram of a list of storage devices which is utilized by the migration control server of FIG. 7.

FIGS. 7 and 8 provide particular details of the migration control server 28. In particular, FIG. 7 shows particular components of the migration control server 28. FIG. 8 shows a list data structure which is utilized by the migration control server 28 during migration.

As shown in FIG. 7, the migration control server 28 includes an interface 200, a controller 202, and memory 204. The interface 200 includes circuitry (e.g., a network interface card) which enables the migration control server 28 to connect to the communications medium 30 (also see FIG. 1) and communicate with external devices through the communications medium 30. Additionally, the interface 200 includes circuitry (e.g., a keyboard, a mouse, a display, etc.) which enables the migration control server 28 to receive input from a user and provide information back to the user.

The controller 202 is formed by processing circuitry (e.g., a microprocessor, a set of processor modules, etc.) and is constructed and arranged to provide central control over the migration process. Such control is based on user input provided through the interface 200. Along these lines, the controller 202 is configured to perform the procedure 100 (also see FIGS. 3a and 3b) and preferably includes a variety of control mechanisms which are utilized during the migration process such as the timer 210 for measuring the predefined amount of time within which the source devices 62 are to transition from the active mode to the passive mode (also see step 108 in FIG. 3b).

The memory 204 stores a variety of memory constructs which are executable and/or accessible by the controller 202. In particular, the memory 204 includes an operating system 212, a migration application 214, and migration process data 216. The operating system 212 allows the migration control server 28 to make efficient use of various resources (e.g., compute cycles, memory, etc.). The migration application 214 runs the migration process. The migration process data 216, among other things, enables the migration application 214 to direct and monitor various operation details during the migration process.

It should be understood that one or more of the memory constructs (e.g., the migration application 214) is capable of being delivered to and installed on the migration control server 28 from a computer program product 220 (illustrated generally by a diskette icon). Such a computer program product 220 includes a computer readable storage medium which stores, in a non-volatile manner, information that is utilized by the controller 102. Examples of suitable computer readable storage media include CD-ROM, magnetic disk or tape cartridges, flash memory, disk memory, and the like.

FIG. 8 shows a storage device list 250 which is constructed and utilized by the controller 202 while running the migration application 214 (also see step 102 in FIG. 3a and the migration process data 216 in FIG. 7). The list 250 may be implemented in a variety of forms such as a database, a table, a linked list, etc.

The list 250 includes entries 252 which correspond to the storage devices 62, 72 of the arrays 24, 26 (also see FIG. 1). Each entry 252 includes a device identifier field 260, an array identifier field 262, a mode status field 264, and other fields 266. The contents of the device identifier field 260 of each entry 252 uniquely identifies a particular storage device 62, 72 corresponding to that entry 252. The contents of the array identifier field 262 identifies an array location (i.e., which array) of the identified storage device 62, 72. The contents of the mode status field 264 identifies the mode status of the identified storage device 62, 72 (e.g., active, passive, stalled-active, offline, failed, etc.). The other fields 266 contain other control/status information associated with the identified storage device 62, 72 such as the device's serial number, type, capacity, zone, consistency group, RAID group, and so on.

Along these lines, entry 252(s1)(1) corresponds to a storage device of an array s1 (e.g., the source array 24(1)), entry 252(s1)(2) corresponds to another storage device of the array s1, and so on. Similarly, entry 252(s2)(1) corresponds to a storage device of an array s2 (e.g., the source array 24(2)), entry 252(s2)(2) corresponds to another storage device of the array s2, and so on. Likewise, entry 252(t1)(1) corresponds to a storage device of a target array t1 (e.g., the target array 26(1)), and entry 252(t2)(1) corresponds to a storage device of another target array t2 (e.g., the target arrays 26(2)), etc.

It should be understood that the controller 202 is able to update the mode status fields 264 of the source device entries 252 as it sends instructions (e.g., system calls which result in vendor unique SCSI commands) to the source arrays 24 to individually transition each source device 62 from the active mode to the passive mode, and receives back responses (step 108). In particular, each response indicates whether the transition was or was not successful. Additionally, the controller 202 routinely polls the source devices 62 for updated mode status (e.g., via command tunneling through the target arrays 26). For example, the controller 202 has determined that storage device "s2_2" of the source array "s2" is in the passive mode, see entry 252(s2)(2) of the list 250. In this manner, the controller 202 is able to monitor progress and determine when all of the source devices 62 have transitioned to from the active mode to the passive mode.

Similarly, the controller 202 updates the mode status fields 264 of the target device entries 252. As a result, the controller 202 maintains a comprehensive view of the various storage devices 62, 72 involved in the migration process.

Conclusion

As described above, improved techniques provide multi-machine atomic seamless migration. In particular, data migration from multiple source arrays 24 to multiple target arrays 26 occurs while hosts 22 run MPIO software 54 to maintain online access to host data 64. Due to smart management of the source and target arrays 24, 26, the migration process is performed as an atomic operation in the sense that it is possible to fail back to all of the source arrays 24 in the event that a failure occurs during the migration process. That is, if at least one storage device 62 of the multiple source arrays 24 fails to transition from active mode to passive mode as part of the migration process, the migration process stops and the storage devices 62 of the multiple source arrays transition back to the active mode to enable the hosts 22 to maintain online access to the host data via the multiple source arrays 24. However, if all of the source arrays 24 properly transition from the active mode to the passive mode, the hosts 22 can immediately access the host data 64 via the multiple target arrays 26. Therefore, the improved techniques are able to prevent a situation in which one source array successfully completes migration to a target array while another source array fails to complete migration to another target array.

While various embodiments of the invention have been particularly shown and described, it will be understood by those skilled in the art that various changes in form and details may be made therein without departing from the spirit and scope of the invention as defined by the appended claims.

For example, it should be understood that the migration process was described above as migrating multiple source arrays 24 to multiple target arrays 26. The migration process is also well-suited for data migration involving consolidation of multiple arrays. In particular, the same migration process can be applied to migrate at least two source arrays 24 to a single target array 26 (e.g., at least two source arrays 24 to one target array 26, three source arrays 24 to two target arrays 26, etc.). In this situation, the number of target devices 72 on the target array 26 is at least as large as the total number of source devices 62 on the corresponding multiple source arrays 24.

Additionally, it should be understood that modifications and enhancements can be made to the computerized environment 20 (also see FIG. 1). For example, any of the hosts 22 can be modified to operate as the migration control server 28. Similarly, the migration control server 28 can be modified to operate as a host 22.

Furthermore, it should be understood that the hosts 22 may operate as a cluster of nodes to achieve a common overall body of work. Alternatively, the hosts 22 may perform different specialized operations. Moreover, in addition to accessing the arrays 24, 26 the hosts may perform other operations including backup, mirroring and/or an administrative operations.

Additionally, it should be understood that the communication medium 30 may be a network connection, bus, and/or other type of data link, such as a hardwire or other connections known in the art. For example, the communication medium 30 may be the Internet, an intranet, network or other connection(s) by which the host 22, and the migration control server 28 may access and communicate with the data storage arrays 24, 26.

Moreover, the processing circuitry 50 included in the hosts 22 and the migration control server 28 may be any one of a variety of commercially available single or multi-processor systems, such as an Intel-based processor, or other type of commercially available processor able to support each particular embodiment and application.

Furthermore, it should be understood that the failback operation between the arrays 24, 26 can be overridden. For example, the operator of the arrays 24, 26 may decide that it is acceptable if one or more of the source devices 62 fails to transition from active to passive. In some arrangements, the arrays 24, 26 offer an override parameter or an override threshold to enable the operator to identify the amount of failure that is tolerable before failback occurs. For a failed source device 62, if the migration process is allowed to complete, and the operator can manually complete the migration process for the failed source device 62.

It should be noted that the particulars of the hardware and software included in each of the hosts 22 and the migration control server 28, as well as those components that may be included in the data storage arrays 24, 26 may vary with each particular embodiment and within an embodiment. Along these lines, the hosts 22 and the migration control server 28 may be located at the same physical site, or, alternatively, may also be located in different physical locations. Furthermore, different portions of the communication medium 30 may vary in data format and communications technique, e.g., Connectrix or other Fibre Channel switching equipment, Ethernet, phone line, repeaters, a multiplexers, satellite, etc. Such modifications and enhancements are intended to belong to various embodiments.

What is claimed is:

1. A method of migrating data from storage devices of a set of source arrays to storage devices of a set of target arrays, each storage device being capable of operating in (i) an active mode in which that storage device is permitted to perform host read and write operations and (ii) a passive mode in which that storage device is not permitted to perform host read and write operations, the method comprising:
    while a host initially accesses host data from the set of source arrays using multipath I/O software, providing active-to-passive instructions to the set of source arrays, the active-to-passive instructions identifying the storage devices of the set of source arrays to be transitioned from the active mode to the passive mode;
    during a predefined time period, monitoring whether the storage devices of the set of source arrays have transitioned from the active mode to the passive mode in response to the active-to-passive instructions;
    after the predefined time period, (i) if all of the storage devices of the set of source arrays have transitioned from the active mode to the passive mode, operating the storage devices of the set of target arrays in the active mode and beginning a data transfer operation which transfers data from the storage devices of the set of source arrays to the storage devices of the set of target arrays to enable the host to access the host data from the set of target arrays using the multipath I/O software, and (ii) if at least one storage device of the set of storage devices of the set of source arrays has not transitioned from the active mode to the passive mode, providing passive-to-active instructions to the set of source arrays, the passive-to-active instructions identifying the storage devices of the set of source arrays to be transitioned from the passive mode back to the active mode to enable the host to access the host data from the set of source arrays using the multipath I/O software.

2. A method as in claim 1 wherein providing the active-to-passive instructions to the set of source arrays includes:
    sending the active-to-passive instructions from the set of target arrays to the set of source arrays.

3. A method as in claim 2 wherein sending the active-to-passive instructions from the set of target arrays to the set of source arrays includes:
    transmitting, as the active-to-passive instructions, a set of vendor-unique small computer system interface (SCSI) commands from the set of target arrays to the set of source arrays.

4. A method as in claim 3 wherein transmitting the set of vendor-unique SCSI commands includes:
    receiving a set of system calls from a migration control server which is external to the set of target arrays, and outputting the set of vendor-unique SCSI commands in response to the set of system calls from the migration control server.

5. A method as in claim 4 wherein a migration control server maintains a list of storage device entries, at least some of the storage device entries being source device entries which correspond to source devices of the set of source arrays, each source device entry identifying (i) a source device of the set of source arrays and (ii) mode status of that source device; and
    wherein monitoring whether the storage devices of the set of source arrays have transitioned from the active mode to the passive mode in response to the active-to-passive instructions includes updating the mode status of the source device entries of the list based on status received from the set of source arrays.

6. A method as in claim 3 wherein the set of source arrays includes a first source array and a second source array;
    wherein the set of vendor-unique SCSI commands includes a first vendor-unique SCSI command which corresponds to a storage device of the first source array, and a second vendor-unique SCSI command which corresponds to a storage device of the second source array; and
    wherein transmitting the set of vendor-unique SCSI commands includes outputting (i) the first vendor-unique SCSI command from the set of target arrays to the first source array to transition the storage device of the first source array from the active mode to the passive mode, and (ii) the second vendor-unique SCSI command from the set of target arrays to the second source array to transition the storage device of the second source array from the active mode to the passive mode.

7. A method as in claim 6 wherein the set of target arrays includes a first target array and a second target array; and
    wherein outputting includes providing (i) the first vendor-unique SCSI command from the first target array to the first source array and (ii) the second vendor-unique SCSI command from the second target array to the second source array.

8. A method as in claim 6 wherein the host runs a database application which is constructed and arranged to access, prior to providing active-to-passive instructions from the set of target arrays to the set of source arrays, (i) a first source consistency group of source storage devices of the first source array and (ii) a second source consistency group of source storage devices of the second source array; and
    wherein operating the storage devices of the set of target arrays in the active mode to enable the host to access the host data from the set of target arrays using the multipath I/O software includes providing the host with access to (i) a first target consistency group of target storage devices of the set of target arrays and (ii) a second target consistency group of target storage of the set of target arrays, the first target consistency group corresponding to the first source consistency group, and the second target consistency group corresponding to the second source consistency group.

9. A method as in claim 1, further comprising:
    during the predefined time period, receiving host read and write requests at the set of target arrays and delaying transmission of result signals from the set of target arrays to the host in response to the host read and write requests until after the predefined time period has passed.

10. A method as in claim 9, further comprising:
    transmitting, as the result signals, successful completion responses from the set of target arrays to the host in response to the host read and write requests when all of the storage devices of the set of source arrays have transitioned from the active mode to the passive mode within the predefined time period.

11. A method as in claim 9, further comprising:
after the predefined time period, transmitting, as the result signals, failure responses from the set of target arrays to the host in response to the host read and write requests when at least one storage device of the set of storage devices did not transition from the active mode to the passive mode during the predefined time period.

12. A method as in claim 11 wherein providing the passive-to-active instructions to the set of source arrays includes:
transmitting, as the passive-to-active instructions, a set of vendor-unique SCSI commands from the set of target arrays to the set of source arrays to transition the storage devices of the set of source arrays from the passive mode back to the active mode to enable the host to access the host data from the set of storage arrays.

13. A migration control server to migrate data from storage devices of a set of source arrays to storage devices of a set of target arrays, each storage device being capable of operating in (i) an active mode in which that storage device is permitted to perform host read and write operations and (ii) a passive mode in which that storage device is not permitted to perform host read and write operations, the migration control server comprising:
a network interface; and
a controller coupled to the network interface, the controller being constructed and arranged to:
while a host initially accesses host data from the set of source arrays using multipath I/O software, provide active-to-passive instructions to the set of source arrays through the network interface, the active-to-passive instructions identifying the storage devices of the set of source arrays to be transitioned from the active mode to the passive mode;
during a predefined time period, monitor whether the storage devices of the set of source arrays have transitioned from the active mode to the passive mode in response to the active-to-passive instructions;
after the predefined time period, (i) if all of the storage devices of the set of source arrays have transitioned from the active mode to the passive mode, operate the storage devices of the set of target arrays in the active mode and begin a data transfer operation which transfers data from the storage devices of the set of source arrays to the storage devices of the set of target arrays to enable the host to access the host data from the set of target arrays using the multipath I/O software, and (ii) if at least one storage device of the set of storage devices of the set of source arrays has not transitioned from the active mode to the passive mode, provide passive-to-active instructions to the set of source arrays, the passive-to-active instructions identifying the storage devices of the set of source arrays to be transitioned from the passive mode back to the active mode to enable the host to access the host data from the set of source arrays using the multipath I/O software.

14. A migration control server as in claim 13 wherein the controller, when providing the active-to-passive instructions to the set of source arrays, is constructed and arranged to:
send active-to-passive system calls to the set of target arrays, the active-to-passive system calls directing the set of target arrays to send the active-to-passive instructions to the set of source arrays.

15. A migration control server as in claim 14 wherein the controller, when monitoring whether the storage devices of the set of source arrays have transitioned from the active mode to the passive mode in response to the active-to-passive instructions, is constructed and arranged to:
send status request system calls to the set of target arrays, the status request system calls directing the set of target arrays to (i) poll the set of source arrays for status and (ii) convey that status back to the controller of the migration control server.

16. A migration control server as in claim 14 wherein the set of source arrays includes a first source array and a second source array;
wherein the active-to-passive instructions include a first vendor-unique small computer system interface (SCSI) command which corresponds to a storage device of the first source array, and a second vendor-unique SCSI command which corresponds to a storage device of the second source array;
wherein the set of target arrays includes a first target array and a second target array; and
wherein the controller, when sending the active-to-passive system calls to the set of target arrays, is constructed and arranged to output, through the network interface, (i) a first active-to-passive system call to the first target array, the first active-to-passive system call directing the first target array to output the first vendor-unique SCSI command to the first source array to transition the storage device of the first source array from the active mode to the passive mode, and (ii) a second active-to-passive system call to the second target array, the second active-to-passive system call directing the second target array to output the second vendor-unique SCSI command to the second source array to transition the storage device of the second source array from the active mode to the passive mode.

17. A migration control server as in claim 14, further comprising:
memory coupled to the controller, the memory being constructed and arranged to maintain a list of storage device entries, at least some of the storage device entries being source device entries which correspond to source devices of the set of source arrays, each source device entry identifying (i) a source device of the set of source arrays and (ii) mode status of that source device; and
wherein the controller, when monitoring whether the storage devices of the set of source arrays have transitioned from the active mode to the passive mode in response to the active-to-passive instructions, is constructed and arranged to update the mode status of the source device entries of the list.

18. A migration control server as in claim 17 wherein, the controller, when providing the passive-to-active instructions to the set of source arrays, is constructed and arranged to:
based on the mode status of the source device entries of the list, detect occurrence of a failure event indicating that at least one source device of the set of source arrays failed to transition from active mode to passive mode during the predefined time period, and
in response to detection of the occurrence of the failure event, sending passive-to-active system calls to the set of target arrays, the passive-to-active system calls directing the set of target arrays to send the passive-to-active instructions to the set of source arrays to transition the source devices of the set of source arrays from the passive mode back to the active mode.

19. A computer program product including a non-transitory computer readable storage medium storing a set of executable instructions which, when executed by a computer, cause the computer to perform a method of migrating data from storage devices of a set of source arrays to storage devices of a set of target arrays, each storage device being capable of operating in (i) an active mode in which that storage device is permitted to perform host read and write operations and (ii) a passive mode in which that storage device is not permitted to perform host read and write operations, the method comprising:

while a host initially accesses host data from the set of source arrays using multipath I/O software, providing active-to-passive instructions to the set of source arrays, the active-to-passive instructions identifying the storage devices of the set of source arrays to be transitioned from the active mode to the passive mode;

during a predefined time period, monitoring whether the storage devices of the set of source arrays have transitioned from the active mode to the passive mode in response to the active-to-passive instructions;

after the predefined time period, (i) if all of the storage devices of the set of source arrays have transitioned from the active mode to the passive mode, operating the storage devices of the set of target arrays in the active mode and beginning a data transfer operation which transfers data from the storage devices of the set of source arrays to the storage devices of the set of target arrays to enable the host to access the host data from the set of target arrays using the multipath I/O software, and (ii) if at least one storage device of the set of storage devices of the set of source arrays has not transitioned from the active mode to the passive mode, providing passive-to-active instructions to the set of source arrays, the passive-to-active instructions identifying the storage devices of the set of source arrays to be transitioned from the passive mode back to the active mode to enable the host to access the host data from the set of source arrays using the multipath I/O software.

20. A data storage array to operate as one of a set of target arrays involved in a migration process in which data is migrated from storage devices of a set of source arrays to storage devices of the set of target arrays, each storage device being capable of operating in (i) an active mode in which that storage device is permitted to perform host read and write operations and (ii) a passive mode in which that storage device is not permitted to perform host read and write operations, the data storage array comprising:

an external interface;

a group of storage devices;

processing circuitry coupled to the external interface and the group of storage devices, the processing circuitry being constructed and arranged to:

while a host initially accesses host data from the set of source arrays using multipath I/O software, provide active-to-passive instructions to the set of source arrays through the external interface, the active-to-passive instructions identifying the storage devices of the set of source arrays to be transitioned from the active mode to the passive mode;

during a predefined time period, monitor whether the storage devices of the set of source arrays have transitioned from the active mode to the passive mode in response to the active-to-passive instructions;

after the predefined time period, (i) if all of the storage devices of the set of source arrays have transitioned from the active mode to the passive mode, operate the set of storage devices in the active mode and begin a data transfer operation which transfers data from a group of storage devices of the set of source arrays to the group of storage devices to enable the host to access the host data from the group of storage devices using the multipath I/O software, and (ii) if at least one storage device of the set of storage devices of the set of source arrays has not transitioned from the active mode to the passive mode, provide passive-to-active instructions to the set of source arrays through the external interface, the passive-to-active instructions identifying the storage devices of the set of source arrays to be transitioned from the passive mode back to the active mode to enable the host to access the host data from the set of source arrays using the multipath I/O software.

21. A data storage array as in claim 20 wherein the processing circuitry, when providing the active-to-passive instructions to the set of source arrays, is constructed and arranged to:

receive active-to-passive system calls from a migration control server through the external interface, and send the active-to-passive instructions to the set of source arrays through the external interface in response to the active-to-passive system calls from the migration control server.

22. A data storage array as in claim 21 wherein the processing circuitry, when sending the active-to-passive instructions to the set of source arrays, is constructed and arranged to:

output, as the active-to-passive instructions, a set of vendor-unique small computer system interface (SCSI) commands to the set of source arrays through the external interface.

23. A data storage array as in claim 21 wherein the processing circuitry, when monitoring whether the storage devices of the set of source arrays have transitioned from the active mode to the passive mode in response to the active-to-passive instructions, is constructed and arranged to:

receive status request system calls from the migration control server through the external interface, and in response to the status request system calls from the migration control server, (i) poll the set of source arrays for status and (ii) convey that status back to the migration control server.

24. A data storage array as in claim 23 wherein, the processing circuitry, when providing the passive-to-active instructions to the set of source arrays, is constructed and arranged to:

in response to the status conveyed back to the migration control server, receive passive-to-active system calls from the migration control server following detection of occurrence of a failure event by the migration control server, the failure event indicating that at least one storage device of the set of source arrays failed to transition from active mode to passive mode during the predefined time period, and in response to the passive-to-active system calls from the migration control server, outputting the passive-to-active instructions to the set of source arrays to transition the storage devices of the set of source arrays from the passive mode back to the active mode.

25. A data storage array as in claim 20 wherein the processing circuitry is further constructed and arranged to:

during predefined time period, receive host read and write requests through the external interface, and delay transmission of result signals to the host in response to the host read and write requests until after the predefined time period has passed.

26. A computer program product including a non-transitory computer readable storage medium storing executable code which, when executed by a set of target arrays, cause the set of target arrays to participate in a process of migrating data from storage devices of a set of source arrays to storage devices of the set of target arrays, each storage device being capable of operating in (i) an active mode in which that storage device is permitted to perform host read and write operations and (ii) a passive mode in which that storage device is not permitted to perform host read and write operations, the process comprising:
  while a host initially accesses host data from the set of source arrays using multipath I/O software, providing active-to-passive instructions to the set of source arrays, the active-to-passive instructions identifying the storage devices of the set of source arrays to be transitioned from the active mode to the passive mode;
  during a predefined time period, monitoring whether the storage devices of the set of source arrays have transitioned from the active mode to the passive mode in response to the active-to-passive instructions;
  after the predefined time period, (i) if all of the storage devices of the set of source arrays have transitioned from the active mode to the passive mode, operating the storage devices of the set of target arrays in the active mode and beginning a data transfer operation which transfers data from the storage devices of the set of source arrays to the storage devices of the set of target arrays to enable the host to access the host data from the set of target arrays using the multipath I/O software, and (ii) if at least one storage device of the set of storage devices has not transitioned from the active mode to the passive mode, providing passive-to-active instructions to the set of source arrays, the passive-to-active instructions identifying the storage devices of the set of source arrays to be transitioned from the passive mode back to the active mode to enable the host to access the host data from the set of source arrays using the multipath I/O software.

* * * * *